(12) United States Patent
Sun et al.

(10) Patent No.: US 12,167,006 B2
(45) Date of Patent: Dec. 10, 2024

(54) RESOLUTION-ADAPTIVE VIDEO CODING

(71) Applicant: Alibaba Group Holding Limited, Grand Cayman (KY)

(72) Inventors: Yu-Chen Sun, Bellevue, WA (US); Tsui-shan Chang, Hangzhou (CN); Jian Lou, Bellevue, WA (US)

(73) Assignee: Alibaba Group Holding Limited (KY)

( * ) Notice: Subject to any disclaimer, the term of this patent is extended or adjusted under 35 U.S.C. 154(b) by 66 days.

(21) Appl. No.: 17/607,348

(22) PCT Filed: Jul. 9, 2019

(86) PCT No.: PCT/CN2019/095293
§ 371 (c)(1),
(2) Date: Oct. 28, 2021

(87) PCT Pub. No.: WO2021/003671
PCT Pub. Date: Jan. 14, 2021

(65) Prior Publication Data
US 2022/0224925 A1 Jul. 14, 2022

(51) Int. Cl.
*H04N 19/33* (2014.01)
*H04N 19/105* (2014.01)
(Continued)

(52) U.S. Cl.
CPC .......... *H04N 19/33* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS 7,068,722 B2  6/2006 Wells
7,526,027 B2  4/2009 Sekiguchi et al.
(Continued)

FOREIGN PATENT DOCUMENTS

CN  1684517 A   10/2005
CN  101710993 A  5/2010
(Continued)

OTHER PUBLICATIONS

Bordes, et al, "AHG18 Resolution adaptation Coding (ARC) using single-resolution in DPB", MPEG Meeting, No. m23196, Jan. 27, 2012, 11 pages.
(Continued)

*Primary Examiner* — Kaitlin A Retallick
(74) *Attorney, Agent, or Firm* — Lee & Hayes, P.C.

(57) ABSTRACT

Systems and methods are provided for implementing inter-coded resolution-adaptive video coding supported by resizing motion information of a current frame during motion prediction, reducing extensive computational costs and computing time that would be incurred as a result of extensive application of interpolation filters to generate picture information of a reference frame to sub-pixel granularity, and thus reducing computational cost and computing time of decoding as a whole. The methods and systems described herein include determining a ratio of the resolution of a reference frame to the resolution of a current frame; determining a motion vector of the block of the current frame, and calculating at least one pixel coordinate corresponding to the motion vector of the block of the current frame; resizing motion information of the block of the current frame according to a resolution of the reference frame in accordance with the ratio; locating a predictor block of the reference frame in accordance with the resized motion information; and subsequently minimizing or avoiding applying an interpolation
(Continued)

filter to a block at the scaled coordinates at the reference frame to generate sub-pixel values of the predictor block.

17 Claims, 6 Drawing Sheets

(51) Int. Cl.
  *H04N 19/139* (2014.01)
  *H04N 19/176* (2014.01)
  *H04N 19/52* (2014.01)
  *H04N 19/59* (2014.01)
  *H04N 19/82* (2014.01)

(52) U.S. Cl.
  CPC ........... *H04N 19/176* (2014.11); *H04N 19/52* (2014.11); *H04N 19/59* (2014.11); *H04N 19/82* (2014.11)

(56) References Cited

U.S. PATENT DOCUMENTS

| | | | |
|---|---|---|---|
| 7,773,672 | B2 | 8/2010 | Prieto et al. |
| 7,889,793 | B2 | 2/2011 | Han et al. |
| 8,045,616 | B2 | 10/2011 | Sekiguchi et al. |
| 8,155,181 | B2 | 4/2012 | Han et al. |
| 8,170,110 | B2 | 5/2012 | Po et al. |
| 8,290,038 | B1 | 10/2012 | Wang et al. |
| 8,315,310 | B2 | 11/2012 | Shi et al. |
| 8,396,114 | B2 | 3/2013 | Gu et al. |
| 8,406,301 | B2 | 3/2013 | Boyce |
| 8,422,546 | B2 | 4/2013 | Lin et al. |
| 8,442,108 | B2 | 5/2013 | Song et al. |
| 8,705,609 | B2 | 4/2014 | Bae |
| 8,761,259 | B2 | 6/2014 | Wang et al. |
| 8,767,825 | B1 | 7/2014 | Wang et al. |
| 8,891,619 | B2 | 11/2014 | Leontaris et al. |
| 9,106,920 | B2 | 8/2015 | Rusert et al. |
| 9,426,414 | B2 | 8/2016 | Dane et al. |
| 9,503,739 | B2 | 11/2016 | Dane et al. |
| 10,419,752 | B2 | 9/2019 | Lim et al. |
| 10,469,839 | B2 | 11/2019 | Moriya et al. |
| 2005/0013498 | A1 | 1/2005 | Srinivasan et al. |
| 2006/0209961 | A1 | 9/2006 | Han et al. |
| 2006/0210184 | A1 | 9/2006 | Song et al. |
| 2006/0233258 | A1 | 10/2006 | Holcomb |
| 2007/0047649 | A1 | 3/2007 | Suzuki et al. |
| 2007/0058877 | A1 | 3/2007 | Song et al. |
| 2007/0098068 | A1 | 5/2007 | Kimata et al. |
| 2007/0274385 | A1 | 11/2007 | He |
| 2009/0180536 | A1 | 7/2009 | Shimofure |
| 2009/0207919 | A1 | 8/2009 | Yin et al. |
| 2010/0208086 | A1 | 8/2010 | Kothandaraman et al. |
| 2011/0170596 | A1 | 7/2011 | Shi et al. |
| 2012/0201293 | A1 | 8/2012 | Guo et al. |
| 2014/0253681 | A1* | 9/2014 | Zhang ................. H04N 19/513 348/43 |
| 2015/0103896 | A1 | 4/2015 | Kim et al. |
| 2016/0005155 | A1 | 1/2016 | Sato |
| 2016/0119639 | A1 | 4/2016 | Sato |
| 2016/0119642 | A1 | 4/2016 | Wu |
| 2016/0241882 | A1 | 8/2016 | Sato |
| 2017/0085871 | A1 | 3/2017 | Wang et al. |
| 2019/0356922 | A1 | 11/2019 | Park et al. |
| 2020/0213618 | A1 | 7/2020 | Sun et al. |
| 2020/0366929 | A1 | 11/2020 | Sun et al. |
| 2020/0374525 | A1* | 11/2020 | Gao ..................... H04N 19/177 |
| 2021/0067771 | A1 | 3/2021 | Lin et al. |
| 2021/0084291 | A1 | 3/2021 | Chang et al. |
| 2023/0239461 | A1 | 7/2023 | Chang |

FOREIGN PATENT DOCUMENTS

| | | | |
|---|---|---|---|
| CN | 102075743 | A | 5/2011 |
| CN | 102883161 | A | 1/2013 |
| CN | 105338361 | A | 2/2016 |
| CN | 106162174 | A | 11/2016 |
| CN | 107155107 | A | 9/2017 |
| CN | 108833923 | A | 11/2018 |
| CN | 108848376 | A | 11/2018 |
| CN | 108848377 | A | 11/2018 |
| CN | 108848380 | A | 11/2018 |
| CN | 109845258 | A | 6/2019 |
| EP | 1534015 | A2 | 5/2005 |
| JP | 2008079152 | A | 4/2008 |
| JP | 2012504904 | A | 2/2012 |
| JP | 20145022822 | A | 2/2014 |
| JP | 2015512216 | | 4/2015 |
| JP | 2016502379 | A | 1/2016 |
| JP | 2017153145 | A | 8/2017 |
| JP | 2018533286 | | 11/2018 |
| JP | 2022532334 | A | 7/2022 |
| WO | WO2010039288 | A1 | 4/2010 |
| WO | WO2012094414 | A1 | 7/2012 |
| WO | WO2016183224 | A1 | 11/2016 |
| WO | WO2019242563 | A1 | 12/2019 |

OTHER PUBLICATIONS

Chang, et al, "AHG8: Support for reference picture resampling—handling of resampling, TMVP, DMVR, and BDOF", JVET Meeting, No. JVET-O0134, Jun. 30, 2019, 4 pages.

Chen, et al, "AHG 8: Adaptive Resolution Change", JVET of ITU-T SG 16 WP 3, 15th Meeting, Jul. 3-12, 2019, retrieved from internet, pp. 1-8.

Chen et al, "Algorithm description for Versatile Video Coding and Test Model 3 (VTM 3)," Joint Video Experts Team (JVET) of ITU-T SG 16 WP 3 and ISO/IEC JTC 1/SC 29/WG 11, 12th Meeting: Macao, CN, Oct. 3-12Jul. 10-18, 2018, 7 pages.

Chen et al, "Algorithm description for Versatile Video Coding and Test Model 2 (VTM 2)," oint Video Experts Team (JVET) of ITU-T SG 16 WP 3 and ISO/IEC JTC 1/SC 29/WG 11, Ljubljana, SI, Jul. 10-18, 2018, 21 pages.

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, Torino, IT Jul. 13-21, 2017, 43 pages.

Chen, et al., "SHVC Test Model 1"Joint Collaborative Team on Video Codfing (JCT-VC) of ITU-T SG16 WP3 and ISO/IEC JTC1/SC29/WG11, 12th Meeting: Geneva, Jan. 2013, pp. 14-23.

Translation of CN Office Action for corresponding CN Application No. 201980007184 mailed Apr. 13, 2022, a counterpart foreign application for U.S. Appl. No. 17/048,446, 7 pages.

Translation of CN Office Action for corresponding CN Application No. 201980007184 mailed Jul. 18, 2022, a counterpart foreign application for U.S. Appl. No. 17/048,446, 6 pages.

Translation of International Search Report for corresponding PCT Application No. PCT/CN2019/077665 mailed Feb. 2, 2019, a counterpart foreign application for U.S. Appl. No. 17/048,446, 3 pages.

Translation of Written Opinion for corresponding PCT Application No. PCT/CN2019/077665 mailed Feb. 2, 2019, a counterpart foreign application for U.S. Appl. No. 17/048,446, 4 pages.

Translation of CN Search Report for corresponding CN Application No. 201980007184 mailed Nov. 30, 2021, a counterpart foreign application for U.S. Appl. No. 17/048,446, 1 page.

Translation of CN Search Report for corresponding CN Application No. 201980007184 mailed Apr. 2, 2022, a counterpart foreign application for U.S. Appl. No. 17/048,446, 1 page.

Davies, "Resolution switching for coding efficiency and resilience", Joint Collaborative Team on Video Coding, 6th Meeting, Turin, IT, Jul. 14-22, 2011, 10 pages.

Extended European Search Report mailed Jan. 17, 2022 for European Patent Application No. 19919072.9, 11 pages.

Extended European Search Report mailed Jan. 5, 2022 for European Patent Application No. 19907994.8, 9 pages.

Partial Supplementary European Search Report mailed Oct. 12, 2021 for European Patent Application No. 19919072.9, 13 pages.

(56) References Cited

OTHER PUBLICATIONS

Translated the Japanese Office Action mailed Mar. 20, 2023 for Japanese patent application No. 2020-561757, a foreign counterpart of U.S. Appl. No. 17/048,446, 17 pages.
Li et al, "AHG18: Comments on the Implementations of Resolution Adaption on HEVC", Joint Collaborative Team on Video Coding, 7th Meeting: Geneva, CH, Nov. 21-30, 2011, 12 pages.
Lin et al., "Motion vector coding in the HEVC standard," IEEE Journal of selected topics in Signal Processing, 2012, pp. 957-968.
Non Final Office Action dated Mar. 4, 2020 for U.S. Appl. No. 16/237,073 "Resolution-Adaptive Video Coding", Sun, 12 pages.
Office Action for U.S. Appl. No. 17/048,446, mailed on Sep. 16, 2021, Chang, "Inter Coding for Adaptive Resolution Video Coding", 11 Pages.
Office Action for U.S. Appl. No. 17/048,446, mailed on Nov. 16, 2022, Chang, "Inter Coding for Adaptive Resolution Video Coding" 10 pages.
Office Action for U.S. Appl. No. 16/938,245, mailed on Dec. 22, 2021, Sun, "Resolution-Adaptive Video Coding", 17 Pages.
Office Action for U.S. Appl. No. 17/048,446, mailed on Feb. 22, 2022, Chang, "Inter Coding for Adaptive Resolution Video Coding", 16 Pages.
Office Action for U.S. Appl. No. 17/048,446, mailed on Jun. 8, 2022, Chnag, "Inter Coding for Adaptive Resolution Video Coding", 12 Pages.

Translation of International Search Report from PCT Application No. PCT/CN2019/095293, mailed Mar. 27, 2020, 4 pages.
Translation of Written Opinion from PCT Application No. PCT/CN2019/095293, mailed Mar. 27, 2020, 3 pages.
Extended European Search Report mailed Feb. 17, 2023 for European Patent Application No. 19936812.7, 9 pages.
Chen, "AHG 19: Adaptive Resolution Change", Joint Video Experts Team of ITU-T SG 16 WP3 and ISO/IEC JTC 1/SC 29/WG 11, 14th Meeting: Geneva, CH Mar. 19-27, 2019 pp. 1-9.
Japanese Office Action mailed Aug. 14, 2023 for Japanese Patent Application No. 2021-568957, a foreign counterpart to U.S. Appl. No. 17/607,348, 16 pages.
Japanese Office Action mailed Sep. 19, 2023 for Japanese Patent Application No. 2020-561757, a foreign counterpart to U.S. Appl. No. 17/048,446, 8 pages.
Japanese Office Action mailed Jan. 29, 2024 for Japanese Application No. 2021-568957, a foreign counterpart to U.S. Appl. No. 17/607,348, 12 pages.
Peisong Chen et al., AHG 8: Adaptive Resolution Change [online], JVET-O0303-v2, Internet, 15th Meeting, Gothenburg, SE, Jul. 3-12, 2019, 10 pages.
Japanese Office Action mailed Mar. 18, 2024 for Japanese Application No. 2020-561757, a foreign counterpart to U.S. Appl. No. 17/048,446, 12 pages.

* cited by examiner

RESOLUTION-ADAPTIVE VIDEO CODING

This Application claims priority to and is a national stage application, filed under 35 U.S.C. § 371, of International Patent Application No. PCT/CN2019/095293, filed on Jul. 9, 2019, which is incorporated herein by reference.

BACKGROUND

In conventional video coding formats, such as the H.264/AVC (Advanced Video Coding) and H.265/HEVC (High Efficiency Video Coding) standards, video frames in a sequence have their size and resolution recorded at the sequence-level in a header. Thus, in order to change frame resolution, a new video sequence must be generated, starting with an intra-coded frame, which carries significantly larger bandwidth costs to transmit than inter-coded frames. Consequently, although it is desirable to adaptively transmit a down-sampled, low resolution video over a network when network bandwidth becomes low, reduced or throttled, it is difficult to realize bandwidth savings while using conventional video coding formats, because the bandwidth costs of adaptively down-sampling offset the bandwidth gains.

Research has been conducted into supporting resolution changing while transmitting inter-coded frames. In the implementation of the AV1 codec, developed by AOM, a new frame type called a switch_frame is provided, which may be transmitted having different resolution than that of previous frames. However, a switch_frame is restricted in its usage, as motion vector coding of a switch_frame cannot reference motion vectors of previous frames. Such references conventionally provide another way to reduce bandwidth costs, so the use of switch_frames still sustains greater bandwidth consumption which offsets bandwidth gains.

In the development of the next-generation video codec specification, VVC/H.266, several new motion prediction coding tools are provided to further support motion vector coding which references previous frames. New techniques are required in order to implement resolution changes in a video sequence with regard to these new coding tools.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
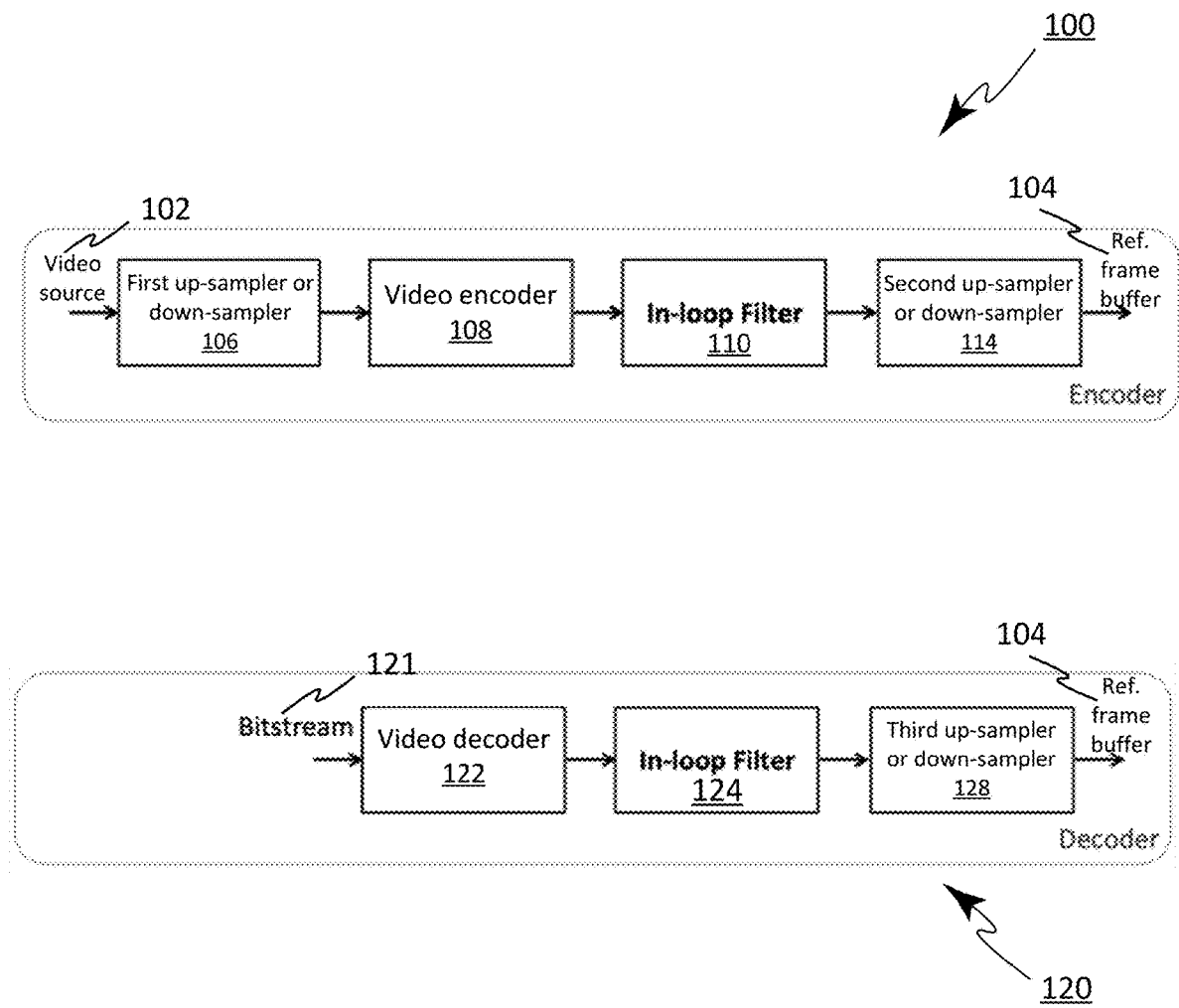
FIG. 1 illustrates an example block diagram of a video coding process according to an example embodiment of the present disclosure.

Systems and methods discussed herein are directed to implement inter-frame adaptive resolution change in a video encoder, and more specifically to implement resizing of motion information of a frame to enable inter-frame adaptive resolution changes based on motion prediction video coding standards.

According to example embodiments of the present disclosure implemented to be compatible with AVC, HEVC, VVC, and such video coding standards implementing motion prediction, a frame may be subdivided into macroblocks (MBs) each having dimensions of 16×16 pixels, which may be further subdivided into partitions. According to example embodiments of the present disclosure implemented to be compatible with the HEVC standard, a frame may be subdivided into coding tree units (CTUs), the luma and chroma components of which may be further subdivided into coding tree blocks (CTBs) which are further subdivided into coding units (CUs). According to example embodiments of the present disclosure implemented as other standards, a frame may be subdivided into units of N×N pixels, which may then be further subdivided into subunits. Each of these largest subdivided units of a frame may generally be referred to as a "block" for the purpose of this disclosure.

According to example embodiments of the present disclosure, a block may be subdivided into partitions having dimensions in multiples of 4×4 pixels. For example, a partition of a block may have dimensions of 8×4 pixels, 4×8 pixels, 8×8 pixels, 16×8 pixels, or 8×16 pixels.

According to example embodiments of the present disclosure, motion prediction coding formats may refer to data formats wherein frames are encoded with motion vector information and prediction information of a frame by the inclusion of one or more references to motion information and prediction units (PUs) of one or more other frames. Motion information may refer to data describing motion of a block structure of a frame or a unit or subunit thereof, such as motion vectors and references to blocks of a current frame or of another frame. PUs may refer to a unit or multiple subunits corresponding to a block structure among multiple block structures of a frame, such as an MB or a CTU, wherein blocks are partitioned based on the frame data and are coded according to established video codecs. Motion information corresponding to a PU may describe motion prediction as encoded by any motion vector coding tool, including, but not limited to, those described herein.

Likewise, frames may be encoded with transform information by the inclusion of one or more transformation units (TUs). Transform information may refer to coefficients representing one of several spatial transformations, such as a diagonal flip, a vertical flip, or a rotation, which may be applied to a sub-block.

Sub-blocks of CUs such as PUs and TUs may be arranged in any combination of sub-block dimensions as described above. A CU may be subdivided into a residual quadtree (RQT), a hierarchical structure of TUs. The RQT provides an order for motion prediction and residual coding over sub-blocks of each level and recursively down each level of the RQT.

A video encoder according to motion prediction coding may obtain a picture from a video source and code the frame to obtain a reconstructed frame that may be output for transmission. Blocks of a reconstructed frame may be intra-coded or inter-coded.

FIG. 1 illustrates an example block diagram of a video coding process 100 according to an example embodiment of the present disclosure.

In a video coding process 100, a picture from a video source 102 may be encoded to generate a reconstructed frame, and the reconstructed frame may be output at a destination such as a reference frame buffer 104 or a transmission buffer. The picture may be input into a coding loop, which may include the steps of inputting the picture into a first in-loop up-sampler or down-sampler 106, generating an up-sampled or down-sampled picture, inputting the up-sampled or down-sampled picture into a video encoder 108, generating a reconstructed frame based on a previous reconstructed frame of the reference frame buffer 104, inputting the reconstructed frame into one or more in-loop filters 110, and outputting the reconstructed frame from the loop, which may include inputting the reconstructed frame into a second up-sampler or down-sampler 114, generating an up-sampled or down-sampled reconstructed frame, and outputting the up-sampled or down-sampled reconstructed frame into the reference frame buffer 104 or into a transmission buffer to be transmitted to a bitstream.

In a video decoding process 120, a coded frame is obtained from a source such as a bitstream 121. According to example embodiments of the present disclosure, given a current frame having position N in the bitstream 121, a previous frame having position N−1 in the bitstream 121 may have a resolution larger than or smaller than a resolution of current frame, and a next frame having position N+1 in the bitstream 121 may have a resolution larger than or smaller than the resolution of the current frame. The current frame may be input into a coding loop, which may include the steps of inputting the current frame into a video decoder 122, inputting the current frame into one or more in-loop filters 124, inputting the current frame into a third in-loop up-sampler or down-sampler 128, generating an up-sampled or down-sampled reconstructed frame, and outputting the up-sampled or down-sampled reconstructed frame into the reference frame buffer 104. Alternatively, the current frame may be output from the loop, which may include outputting the up-sampled or down-sampled reconstructed frame into a display buffer.

According to example embodiments of the present disclosure, the video encoder 108 and the video decoder 122 may each implement a motion prediction coding format, including, but not limited to, those coding formats described herein. Generating a reconstructed frame based on a previous reconstructed frame of the reference frame buffer 104 may include inter-coded motion prediction as described herein, wherein the previous reconstructed frame may be an up-sampled or down-sampled reconstructed frame output by the in-loop up-sampler or down-sampler 114/128, and the previous reconstructed frame serves as a reference picture in inter-coded motion prediction as described herein.

According to example embodiments of the present disclosure, motion prediction information may include a motion vector identifying a predictor block. A motion vector may be a displacement vector representing a displacement between a current block and a predictor block that is referenced for coding of the current block. Displacement may be measured in pixels in a horizontal direction and a vertical direction over a current frame. The displacement vector may represent a displacement between a pixel of the current block and a corresponding pixel of the predictor block at the same positions within the respective blocks. For example, the displacement vector may represent a displacement from a pixel at an upper-left corner of the current block to a pixel at an upper-left corner of the predictor block.

Inter-coded motion prediction may add a block of a current frame and a motion vector of the current frame to locate a predictor block. For example, while decoding a block of the current frame, given a coordinate of a pixel at an upper-left corner of the block of the current frame, a motion vector may indicate a coordinate of a predictor block of a reference frame from which motion information should be derived for the block of the current frame. The coordinate of the predictor block of the reference frame may be located by adding the motion vector to the coordinate of the block of the current frame, assuming that the current frame and the reference frame have the same resolution such that pixels correspond one-to-one between the current frame and the reference frame.

Moreover, motion prediction may support accuracy to an integer pixel scale or to a sub-pixel scale. For example, according to example embodiments of the present disclosure implemented according to the HEVC standard, motion prediction may be accurate to a quarter-pixel scale, such that an interpolation filter is applied to a frame to interpolate the frame by a factor of 4. That is, between every two pixels of the frame, three pixels are generated as sub-pixel picture information. An interpolation filter by a factor of 4 may be implemented as, for example, a 7-tap bilinear filter and an 8-tap Discrete Cosine Transform (DCT)-based finite impulse response (FIR) filter. Interpolation may occur in a first stage wherein interpolation is performed to half-pixel accuracy, such that a first interpolation filter is applied to the frame to interpolate the frame by a factor of 2, and then a second stage wherein interpolation is performed to a quarter-pixel accuracy. Motion prediction accuracy to a sub-pixel scale may increase quality of compressed frames over motion prediction accuracy to an integer pixel scale, but at the cost of increased computational cost and computing time for each pixel interpolated.

According to example embodiments of the present disclosure, a first up-sampler or down-sampler 106, a second up-sampler or down-sampler 114, and a third up-sampler or down-sampler 128 may each implement an up-sampling or down-sampling algorithm suitable for respectively at least up-sampling or down-sampling coded pixel information of a frame coded in a motion prediction coding format. A first up-sampler or down-sampler 106, a second up-sampler or down-sampler 114, and a third up-sampler or down-sampler 128 may each implement an up-sampling or down-sampling algorithm further suitable for respectively upscaling and downscaling motion information such as motion vectors.

A frame serving as a reference picture in generating a reconstructed frame for the current frame, such as the previous reconstructed frame, may therefore be up-sampled or down-sampled in accordance with the resolution of the current frame relative to the resolutions of the previous frame and of the next frame. For example, the frame serving as the reference picture may be up-sampled in the case that the current frame has a resolution larger than the resolutions of either or both the previous frame and the next frame. The frame serving as the reference picture may be down-sampled in the case that the current frame has a resolution smaller than either or both the previous frame and the next frame.

Figure 2:
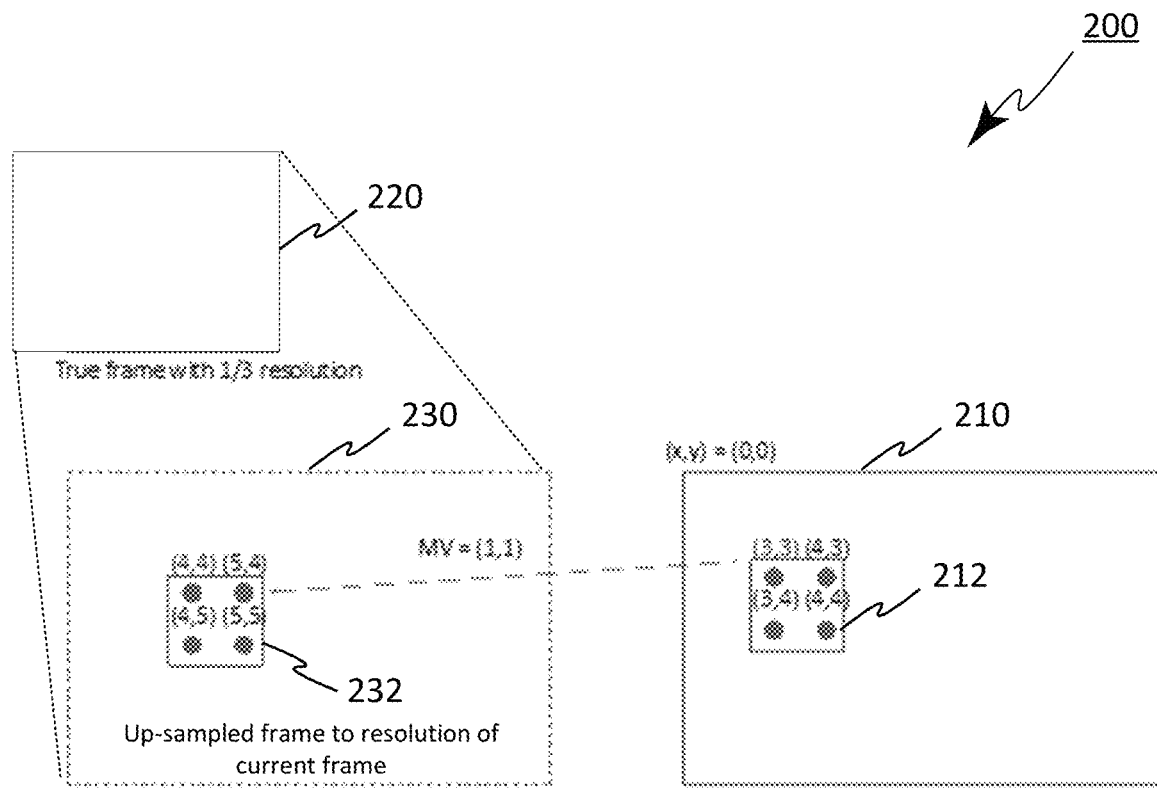
FIG. 2 illustrates an example of motion prediction by up-sampling a reference frame.

FIG. 2 illustrates an example 200 of motion prediction by up-sampling a reference frame as described above. A current frame 210 has a resolution three times the resolution of the reference frame 220, such that the current frame 210 has 9 pixels for each pixel of the reference frame 220; the ratio of the resolution of the reference frame 220 to the resolution of the current frame 210 may be 1:3. Given a block 212 of the current frame 210 having coordinates (3, 3) (i.e., an upper-leftmost pixel of the block 212 has pixel coordinates (3, 3)), and a motion vector (1, 1) of the block 212, adding the motion vector to the coordinates of the block 212 yields the coordinates (4, 4). Thus, the motion vector indicates a predictor block having coordinates at (4, 4).

By up-sampling the reference frame 220 to an up-scaled reference frame 230, this results in the up-scaled reference frame 230 having pixels corresponding one-to-one to the current frame 210. Therefore, the coordinates (4, 4) may be applied directly to the up-scaled reference frame 230, and a predictor block 232 at (4, 4) in the up-scaled reference frame 230 may be used in motion prediction for the current frame 210.

However, performing such operations upon a reference frame may incur substantial computational cost and computing time during a video coding process and/or a video decoding process. For example, up-sampling a reference frame utilizes interpolation filters to generate additional sub-pixel picture information between pixels of the original reference frame, to fill in the additional pixels of the up-sampled reference frame so that pixels of the reference frame correspond one-to-one to pixels of the current frame. When a picture is upsized by a factor of x, for every pixel of the original picture, at least an additional x−1 number of pixels of the up-sampled picture will start out empty and must be filled by an interpolation filter. However, motion prediction utilizing a reference frame is unlikely to reference the majority of the new pixels generated by the interpolation filter, as references to the reference frame are generally to particular predictor blocks of the reference frame pointed to by motion vectors of a current frame. Thus, during a video decoding process, applying an interpolation filter to a reference frame may cause computation of many pixels that ultimately do not contribute to the video decoding process.

According to example embodiments of the present disclosure, upon a video decoder determining that a resolution of a reference frame is different from a resolution of a current frame, instead of the reference frame being up-sampled or down-sampled, the video decoder may instead resize motion information of the current frame, including motion vectors. To resize motion information of the current frame, the video decoder may determine a ratio of a resolution of the current frame to a resolution of the reference frame.

Figure 3:
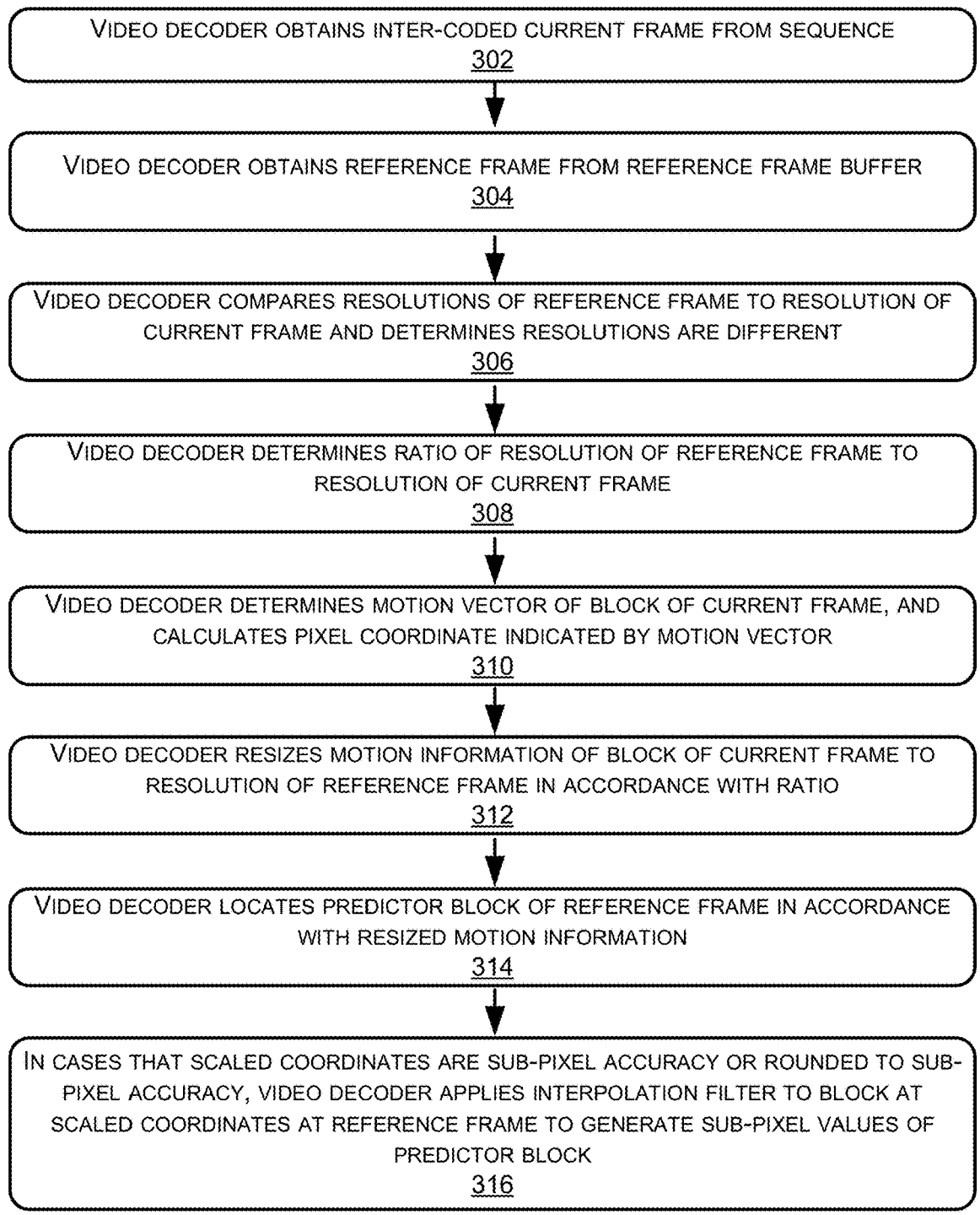
FIG. 3 illustrates a flowchart of a video coding method implementing resolution-adaptive video coding according to example embodiments of the present disclosure.

FIG. 3 illustrates a flowchart of a video coding method 300 implementing resolution-adaptive video coding according to example embodiments of the present disclosure.

At step 302, a video decoder obtains an inter-coded current frame from a sequence. The current frame may have a position N. A previous frame having position N−1 in the sequence may have a resolution larger than or smaller than a resolution of the current frame, and a next frame having position N+1 in the sequence may have a resolution larger than or smaller than the resolution of the current frame.

At step 304, the video decoder obtains a reference frame from a reference frame buffer.

At step 306, the video decoder compares a resolution of the reference frame to a resolution of the current frame and determines that a resolution of the reference frame is different from the resolution of the current frame.

According to example embodiments of the present disclosure, the reference frame having a resolution different from the resolution of the current frame may be, for example, a most recent frame of the reference frame buffer, though the reference frame having a resolution different from the resolution of the current frame may be a frame not the most recent frame of the reference frame buffer.

At step 308, the video decoder determines a ratio of the resolution of the reference frame to the resolution of the current frame.

Figure 4A:
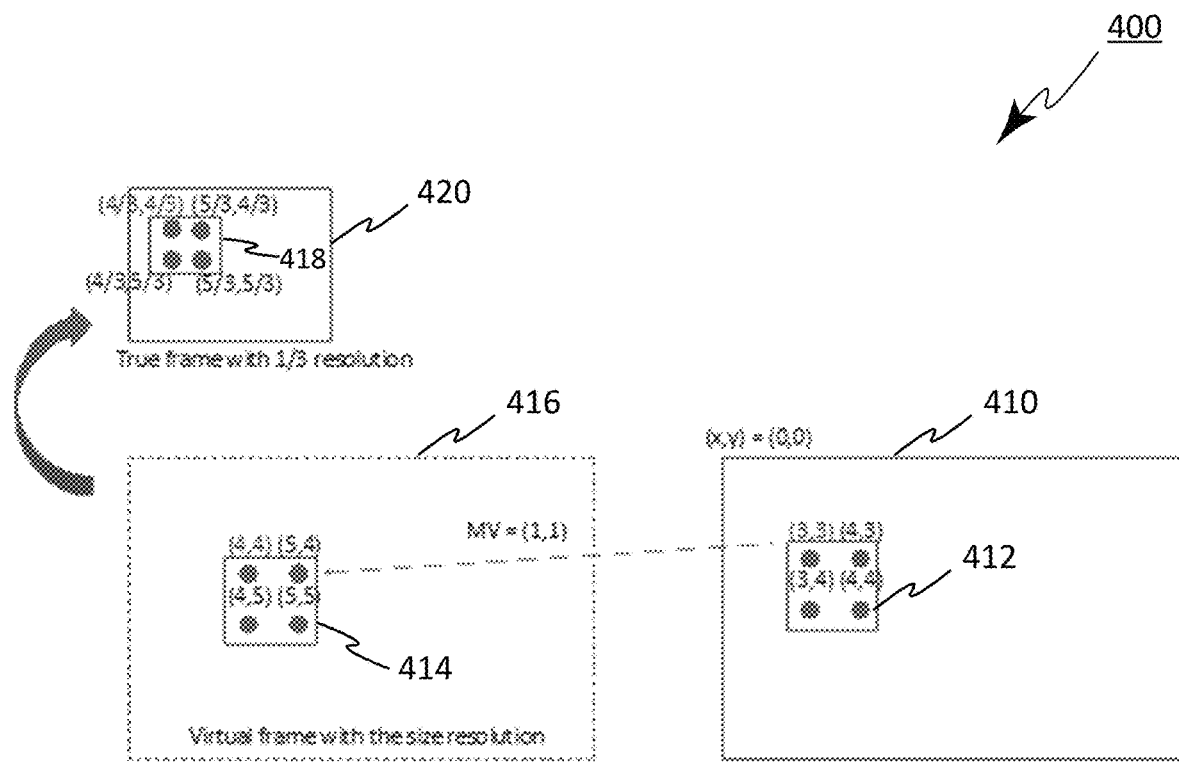
FIGS. 4A through 4C illustrate an example of motion prediction without resizing a reference frame according to example embodiments of the present disclosure.

FIG. 4A illustrates an example 400 of motion prediction without resizing a reference frame as described herein. Similar to the illustration of FIG. 2, the current frame 410 has a resolution three times the resolution of the reference frame 420, such that the current frame 410 has 9 pixels for each pixel of the reference frame 420, and the ratio of the resolution of the reference frame 420 to the resolution of the current frame 410 is 1:3.

At step 310, the video decoder determines a motion vector of the block of the current frame, and calculates a pixel coordinate indicated by the motion vector of the block of the current frame.

The motion vector may be determined in accordance with steps of motion prediction. Steps of performing motion prediction determining motion vectors shall not be described in detail herein, but may include, for example, deriving a motion candidate list for the block of the current frame; selecting a motion candidate from the derived motion candidate list or merging candidate list; and deriving a motion vector of the motion candidate as a motion vector of the block of the current frame.

A decoder may decode a frame on a per-block basis in a coding order among blocks of the frame, such as a raster scan order wherein a first-decoded block is an uppermost and leftmost block of the frame, according to video encoding standards.

As illustrated by FIG. 4A, as an example 400 of calculating a pixel coordinate indicated by a motion vector, given a block 412 of the current frame 410 having coordinates (3, 3) (i.e., an upper-leftmost pixel of the block 412 has pixel coordinates (3, 3)), and a motion vector (1, 1) of the block 412, adding the motion vector to the coordinates of the block 412 yields the coordinates (4, 4). Thus, the motion vector indicates a predictor block having coordinates at (4, 4).

At step 312, the video decoder resizes motion information of the block of the current frame to a resolution of the reference frame in accordance with the ratio.

According to example embodiments of the present disclosure, resizing motion information may include, after adding the scaled motion vector to the scaled block coordinate, scaling the resulting coordinate to derive a scaled coordinate indicated by the motion vector.

As illustrated by FIG. 4A, given the ratio of the resolution of the reference frame 420 to the resolution of the current frame 410 being 1:3, locating a predictor block at the coordinates (4, 4) in the reference frame 420 would produce an incorrect outcome. FIG. 4A illustrates this hypothetical predictor block 414 outlined by a hypothetical reference frame 416 at the same resolution as the current frame 410, which does not exist according to example embodiments of the present disclosure. Instead, the video decoder may multiply the coordinates (4, 4) by a factor of 1/3 based on the ratio 1:3, resulting in the coordinates (4/3, 4/3). FIG. 4A illustrates a hypothetical block 418 having these coordinates in the reference frame 420.

At step 314, the video decoder locates a predictor block of the reference frame in accordance with the resized motion information.

Resized motion information, by itself, may be insufficient for locating a predictor block of the reference frame. Particularly, scaled coordinates indicated by the motion vector may be in proportion to a resolution of the reference frame, but may not correspond to an integer pixel coordinate of the reference frame; may, additionally, not correspond to a half-pixel coordinate of the reference frame in the case that the video decoder implements half-pixel motion prediction; and may, additionally, not correspond to a quarter-pixel coordinate of the reference frame in the case that the video decoder implements quarter-pixel motion prediction. Thus, the video decoder may further round the scaled coordinate of the block to a nearest pixel scale or sub-pixel scale supported by the video decoder.

Figure 4B:
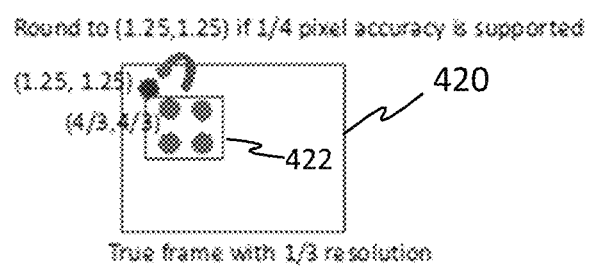
Figure 4C:
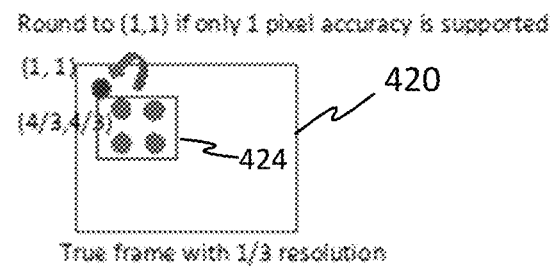

As illustrated by FIGS. 4B and 4C, for example, scaled coordinates of (4/3, 4/3) indicated by the motion vector may not correspond to any pixel coordinate in the reference frame 420, whether at integer pixel accuracy, half-pixel accuracy, or quarter-pixel accuracy. Therefore, the video decoder may round the scaled coordinates to quarter-pixel accuracy in the case that the video decoder supports quarter-pixel accuracy; thus, (4/3, 4/3) may be rounded to (1.25, 1.25), locating a predictor block 422 at (1.25, 1.25). The video decoder may round the scaled coordinates to half-pixel accuracy in the case that the video decoder does not support quarter-pixel accuracy but does support half-pixel accuracy; thus, (4/3, 4/3) may be rounded to (1.5, 1.5), locating a predictor block (not illustrated) at (1.5, 1.5). The video decoder may round the scaled coordinates to integer pixel accuracy in the case that the video decoder does not support either level of sub-pixel accuracy; thus, (4/3, 4/3) may be rounded to (1, 1), locating a predictor block 424 at (1, 1).

In the case that the scaled coordinates are already at sub-pixel accuracy, rounding may be unnecessary, and the video decoder may locate the predictor block directly at the scaled coordinates at the reference frame.

According to other example embodiments of the present disclosure, in the case that the scaled coordinates do not correspond to any level of accuracy supported by the video encoder, the video decoder may nevertheless not round the scaled coordinates to the highest granularity level of accuracy supported by the video decoder. Instead, the video decoder may round the scaled coordinates to a lower granularity level of accuracy than the highest level supported.

At step 316, in the cases that the scaled coordinates are at sub-pixel accuracy or are rounded to sub-pixel accuracy, the video decoder applies an interpolation filter to a block at the scaled coordinates at the reference frame to generate sub-pixel values of the predictor block. The interpolation filter may be applied as described above, and, furthermore, in the cases that the scaled coordinates are at half-pixel accuracy or are rounded to half-pixel accuracy, only the first stage of interpolation as described above may be performed, skipping the second stage, therefore reducing computational costs and computing time of decoding.

In the cases that the scaled coordinates are at integer pixel accuracy or are rounded to integer pixel accuracy, the video decoder does not need to apply an interpolation filter to pixels of the reference block, and step 316 may be skipped with pixels at a block at the scaled coordinates at the reference frame being used directly in motion prediction. Avoidance of application of the interpolation filter may greatly reduce computational costs and computing time of decoding.

Similarly, in the case that the video decoder rounds the scaled coordinates to a lower granularity level of accuracy than the highest level supported as described with regard to step 314, computational costs and computing time may be likewise reduced.

Subsequently, whether step 316 is performed or skipped, the video decoder may decode the current block by reference to the reference frame and the located predictor block therein. The decoded frame may be up-sampled or down-sampled to multiple resolutions each in accordance with a different resolution of a plurality of resolutions supported by a bitstream. The up-sampled and/or down-sampled decoded frames may be input into at least one of a reference frame buffer and a display buffer.

Figure 5:
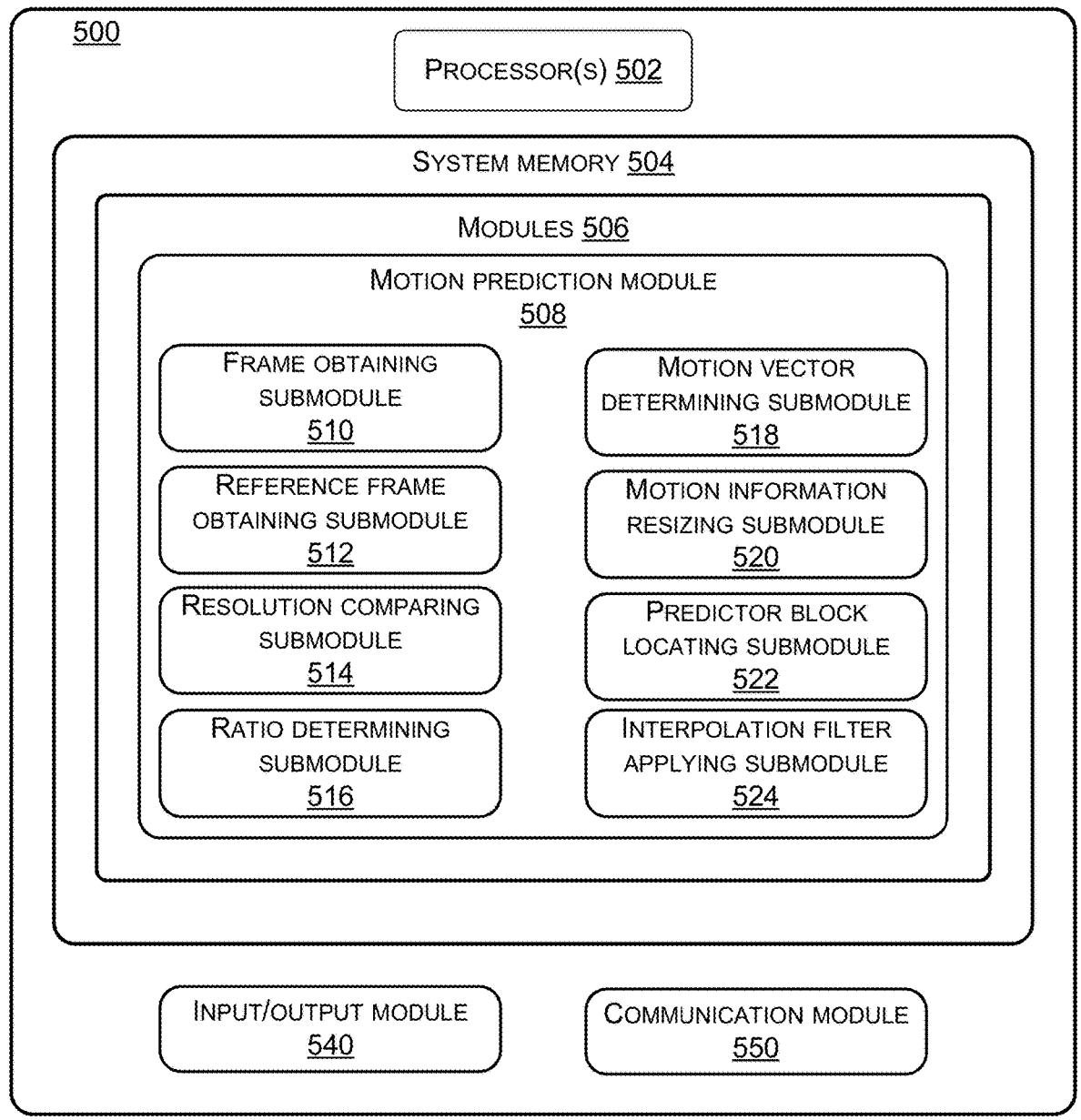
FIG. 5 illustrates an example system for implementing the processes and methods described herein for implementing resolution-adaptive video coding.

FIG. 5 illustrates an example system 500 for implementing the processes and methods described above for implementing resolution-adaptive video coding.

The techniques and mechanisms described herein may be implemented by multiple instances of the system 500 as well as by any other computing device, system, and/or environment. The system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 500 may include one or more processors 502 and system memory 504 communicatively coupled to the processor(s) 502. The processor(s) 502 may execute one or more modules and/or processes to cause the processor(s) 502 to perform a variety of functions. In some embodiments, the processor(s) 502 may include a central processing unit (CPU), a graphics processing unit (GPU), both CPU and GPU, or other processing units or components known in the art. Additionally, each of the processor(s) 502 may possess its own local memory, which also may store program modules, program data, and/or one or more operating systems.

Depending on the exact configuration and type of the system 500, the system memory 504 may be volatile, such as RAM, non-volatile, such as ROM, flash memory, miniature hard drive, memory card, and the like, or some combination thereof. The system memory 504 may include one or more computer-executable modules 506 that are executable by the processor(s) 502.

The modules 506 may include, but are not limited to, a motion prediction module 508, which includes a frame obtaining submodule 510, a reference frame obtaining submodule 512, a resolution comparing submodule 514, a ratio determining submodule 516, a motion vector determining submodule 518, a motion information resizing submodule 520, a predictor block locating submodule 522, and an interpolation filter applying module 524.

The frame obtaining submodule 510 may be configured to obtain an inter-coded current frame from a sequence as abovementioned with reference to FIG. 3.

The reference frame obtaining submodule 512 may be configured to obtain a reference frame from a reference frame buffer as abovementioned with reference to FIG. 3.

The resolution comparing submodule 514 may be configured to compare resolutions of the reference picture to a resolution of the current frame and determine that a resolution of the reference frame is different from the resolution of the current frame, as abovementioned with reference to FIG. 3.

The ratio determining submodule 516 may be configured to determine a ratio of the resolution of the reference frame to the resolution of the current frame, as abovementioned with reference to FIG. 3.

The motion information determining submodule 518 may be configured to determine a motion vector of the block of the current frame, and calculate a pixel coordinate indicated by the motion vector of the block of the current frame, as abovementioned with reference to FIG. 3.

The motion information resizing submodule 520 may be configured to resize motion information of the block of the current frame to a resolution of the reference frame in accordance with the ratio, as abovementioned with reference to FIG. 3.

The predictor block locating submodule 522 may be configured to locate a predictor block of the reference frame in accordance with the resized motion information, as abovementioned with reference to FIG. 3.

The interpolation filter applying submodule 524 may be configured to, in the cases that the scaled coordinates are at sub-pixel accuracy or are rounded to sub-pixel accuracy, apply an interpolation filter to a block at the scaled coordinates at the reference frame to generate sub-pixel values of the predictor block, as abovementioned with reference to FIG. 3.

The system 500 may additionally include an input/output (I/O) interface 540 for receiving video source data and bitstream data, and for outputting decoded frames into a reference frame buffer and/or a display buffer. The system 500 may also include a communication module 550 allowing the system 500 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. A computer-readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides inter-coded resolution-adaptive video coding supported by resizing motion information of a current frame during motion prediction, reducing extensive computational costs and computing time that would be incurred as a result of extensive application of interpolation filters to generate picture information of a reference frame to sub-pixel granularity, and thus reducing computational cost and computing time of decoding as a whole. The methods and systems described herein include determining a ratio of the resolution of a reference frame to the resolution of a current frame; determining a motion vector of the block of the current frame, and calculating a pixel coordinate indicated by the motion vector of the block of the current frame; resizing motion information of the block of the current frame to a resolution of the reference frame in accordance with the ratio; locating a predictor block of the reference frame in accordance with the resized motion information; and subsequently minimizing or avoiding applying an interpolation filter to a block at the scaled coordinates at the reference frame to generate sub-pixel values of the predictor block.

Example Clauses

A. A method comprising: determining motion information of a block of a current frame, the motion information comprising a motion vector of the block and at least one pixel coordinate indicated by the motion vector; resizing the motion information according to a resolution of a reference frame; locating a predictor block of the reference frame in accordance with the resized motion information; and performing motion prediction on the current block by reference to the located predictor block.

B. The method as paragraph A recites, further comprising determining that the resolution of the reference frame is different from a resolution of the current frame, and determining a ratio of the resolution of the reference frame to the resolution of the current frame.

C. The method as paragraph B recites, wherein determining the at least one pixel coordinate corresponding to the motion vector comprises adding the motion vector to at least one pixel coordinate of the block.

D. The method as paragraph C recites, wherein resizing the motion information according to a resolution of the reference frame comprises scaling the at least one pixel coordinate corresponding to the motion vector by the ratio of the resolution of the reference frame to the resolution of the current frame, to derive at least one scaled coordinate corresponding to the motion vector.

E. The method as paragraph D recites, wherein locating the predictor block of the reference frame comprises rounding the at least one scaled coordinate each to a respective nearest value on an integer pixel scale.

F. The method as paragraph F recites, wherein an interpolation filter is not applied to the reference frame before performing motion prediction on the current block by reference to the located predictor block.

G. The method as paragraph D recites, wherein locating the predictor block of the reference frame comprises rounding the at least one scaled coordinate each to a respective nearest value on a sub-pixel scale.

H. The method as paragraph G recites, wherein an interpolation filter accurate to the sub-pixel scale is applied to the reference frame at the at least one scaled coordinate before performing motion prediction on the current block by reference to the located predictor block.

I. The method as paragraph H recites, wherein the sub-pixel scale is less granular than quarter-pixel scale.

J. The method as paragraph I recites, wherein deciding to apply SAO to a CTB of the frame further comprises deciding to apply a band offset to the CTB based on the value of a header flag of the frame.

K. A system comprising: one or more processors; and memory communicatively coupled to the one or more processors, the memory storing computer-executable modules executable by the one or more processors that, when executed by the one or more processors, perform associated operations, the computer-executable modules including: a motion prediction module comprising a motion information determining submodule configured to determine motion information of a block of a current frame, the motion information comprising a motion vector of the block and at least one pixel coordinate corresponding to the motion vector; a motion information resizing submodule configured to resize the motion information according to a resolution of a reference frame; and a predictor block locating submodule configured to locate a predictor block of the reference frame in accordance with the resized motion information; wherein the motion prediction module is further configured to perform motion prediction on the current block by reference to the located predictor block.

L. The system as paragraph K recites, wherein the motion prediction module further comprises a resolution comparing submodule configured to determine that the resolution of the reference frame is different from a resolution of the current frame, and a ratio determining submodule configured to determine a ratio of the resolution of the reference frame to the resolution of the current frame.

M. The system as paragraph L recites, wherein the motion information determining submodule is configured to determine the at least one pixel coordinate corresponding to the motion vector by adding the motion vector to a pixel coordinate of the block.

N. The system as paragraph M recites, wherein the motion information resizing submodule is configured to resize the motion information according to a resolution of the reference frame by scaling the at least one pixel coordinate corresponding to the motion vector by the ratio of the resolution of the reference frame to the resolution of the current frame, to derive at least one scaled coordinate corresponding to the motion vector.

O. The system as paragraph N recites, wherein the predictor block locating submodule is configured to locate the predictor block of the reference frame by rounding the at least one scaled coordinate each to a respective nearest value on an integer pixel scale.

P. The system as paragraph O recites, wherein an interpolation filter is not applied to the reference frame before the motion prediction module performs motion prediction on the current block by reference to the located predictor block.

Q. The system as paragraph N recites, wherein the predictor block locating submodule is configured to locate the predictor block of the reference frame by rounding the at least one scaled coordinate each to a respective nearest value on a sub-pixel scale.

R. The system as paragraph Q recites, further comprising an interpolation filter applying submodule configured to apply an interpolation filter accurate to the sub-pixel scale to the reference frame at the at least one scaled coordinate before the motion prediction module performs motion prediction on the current block by reference to the located predictor block.

S. The system as paragraph R recites, wherein the sub-pixel scale is less granular than quarter-pixel scale.

T. A computer-readable storage medium storing computer-readable instructions executable by one or more processors, that when executed by the one or more processors, cause the one or more processors to perform operations comprising: determining motion information of a block of a current frame, the motion information comprising a motion vector of the block and at least one pixel coordinate corresponding to the motion vector; resizing the motion information according to a resolution of a reference frame; locating a predictor block of the reference frame in accordance with the resized motion information; and performing motion prediction on the current block by reference to the located predictor block.

U. The computer-readable storage medium as paragraph T recites, wherein the operations further comprise determining that the resolution of the reference frame is different from a resolution of the current frame, and determining a ratio of the resolution of the reference frame to the resolution of the current frame.

V. The computer-readable storage medium as paragraph U recites, wherein determining the at least one pixel coordinate corresponding to the motion vector comprises adding the motion vector to at least one pixel coordinate of the block.

W. The computer-readable storage medium as paragraph V recites, wherein resizing the motion information according to a resolution of the reference frame comprises scaling the at least one pixel coordinate corresponding to the motion vector by the ratio of the resolution of the reference frame to the resolution of the current frame, to derive at least one scaled coordinate corresponding to the motion vector.

X. The computer-readable storage medium as paragraph W recites, wherein locating the predictor block of the reference frame comprises rounding the at least one scaled coordinate each to a respective nearest value on an integer pixel scale.

Y. The computer-readable storage medium as paragraph X recites, wherein an interpolation filter is not applied to the reference frame before performing motion prediction on the current block by reference to the located predictor block.

Z. The computer-readable storage medium as paragraph W recites, wherein locating the predictor block of the reference frame comprises rounding the at least one scaled coordinate each to a respective nearest value on a sub-pixel scale.

AA. The computer-readable storage medium as paragraph Z recites, wherein an interpolation filter accurate to the sub-pixel scale is applied to the reference frame at the at least one scaled coordinate before performing motion prediction on the current block by reference to the located predictor block.

BB. The computer-readable storage medium as paragraph AA recites, wherein the sub-pixel scale is less granular than quarter-pixel scale.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining motion information of a block of a current frame, the motion information comprising a motion vector of the block and at least one pixel coordinate corresponding to the motion vector;
   resizing the motion information according to a resolution of a reference frame, the resizing the motion information according to the resolution of the reference frame including scaling at least one pixel coordinate corresponding to the motion vector by a ratio of a resolution of the reference frame to a resolution of a current frame, to derive at least one scaled coordinate corresponding to the motion vector;
   locating a predictor block of the reference frame in accordance with the resized motion information, the locating the predictor block of the reference frame including:
      determining that a video decoder supports a quarter-pixel accuracy; and
      rounding the at least one scaled coordinate each to respective nearest values on a quarter-pixel scale; and
   performing motion prediction on a current block by reference to the located predictor block.

2. The method of claim 1, further comprising determining that the resolution of the reference frame is different from a resolution of the current frame, and determining a ratio of the resolution of the reference frame to the resolution of the current frame.

3. The method of claim 2, wherein determining the at least one pixel coordinate corresponding to the motion vector comprises adding the motion vector to at least one pixel coordinate of the block.

4. The method of claim 1, wherein locating the predictor block of the reference frame comprises rounding the at least one scaled coordinate each to respective nearest values on an integer pixel scale.

5. The method of claim 1, wherein locating the predictor block of the reference frame comprises rounding at least one scaled coordinate each to respective nearest values on a sub-pixel scale.

6. The method of claim 5, wherein an interpolation filter accurate to the sub-pixel scale is applied to the reference frame at the at least one scaled coordinate before performing motion prediction on the current block by reference to the located predictor block.

7. A system comprising:
   one or more processors; and
   memory communicatively coupled to the one or more processors, the memory storing computer-executable modules executable by the one or more processors that, when executed by the one or more processors, perform associated operations, the computer-executable modules including:
      a motion prediction module comprising a motion information determining submodule configured to determine motion information of a block of a current frame, the motion information comprising a motion vector of the block and at least one pixel coordinate corresponding to the motion vector;
      a motion information resizing submodule configured to resize the motion information according to a resolution of a reference frame by scaling the at least one pixel coordinate corresponding to the motion vector by a ratio of a resolution of the reference frame to a resolution of a current frame, to derive at least one scaled coordinate corresponding to the motion vector; and
      a predictor block locating submodule configured to locate a predictor block of the reference frame in accordance with the resized motion information by:
         determining that a video decoder supports a quarter-pixel accuracy; and
         rounding the at least one scaled coordinate each to respective nearest values on a quarter-pixel scale,
      wherein the motion prediction module is further configured to perform motion prediction on a current block by reference to the located predictor block.

8. The system of claim 7, wherein the motion prediction module further comprises a resolution comparing submodule configured to determine that the resolution of the reference frame is different from a resolution of the current frame, and a ratio determining submodule configured to determine a ratio of the resolution of the reference frame to the resolution of the current frame.

9. The system of claim 8, wherein the motion information determining submodule is configured to determine the at least one pixel coordinate corresponding to the motion vector by adding the motion vector to at least one pixel coordinate of the block.

10. The system of claim 7, wherein the predictor block locating submodule is configured to locate the predictor block of the reference frame by rounding the at least one scaled coordinate each to respective nearest values on an integer pixel scale.

11. The system of claim 7, wherein the predictor block locating submodule is configured to locate the predictor block of the reference frame by rounding the at least one scaled coordinate each to a respective nearest value on a sub-pixel scale.

12. The system of claim 11, further comprising an interpolation filter applying submodule configured to apply an interpolation filter accurate to the sub-pixel scale to the reference frame at the at least one scaled coordinate before the motion prediction module performs motion prediction on the current block by reference to the located predictor block.

13. A computer-readable storage medium storing computer-readable instructions executable by one or more processors, that when executed by the one or more processors, cause the one or more processors to perform operations comprising:
   determining motion information of a block of a current frame, the motion information comprising a motion vector of the block and at least one pixel coordinate corresponding to the motion vector;
   resizing the motion information according to a resolution of a reference frame, the resizing the motion information according to the resolution of the reference frame including scaling at least one pixel coordinate corresponding to the motion vector by a ratio of a resolution of the reference frame to a resolution of a current frame, to derive at least one scaled coordinate corresponding to the motion vector;
   locating a predictor block of the reference frame in accordance with the resized motion information, the locating the predictor block of the reference frame including:
      determining that a video decoder does not support a quarter-pixel accuracy and supports a half-pixel accuracy; and
      rounding the at least one scaled coordinate each to respective nearest values on a half-pixel scale; and
   performing motion prediction on a current block by reference to the located predictor block.

14. The computer-readable storage medium of claim 13, wherein the operations further comprise determining that the resolution of the reference frame is different from a resolution of the current frame, and determining a ratio of the resolution of the reference frame to the resolution of the current frame.

15. The computer-readable storage medium of claim 14, wherein determining the at least one pixel coordinate corresponding to the motion vector comprises adding the motion vector to at least one pixel coordinate of the block.

16. The computer-readable storage medium of claim 13, wherein locating the predictor block of the reference frame comprises rounding the at least one scaled coordinate each to a respective nearest value on a sub-pixel scale.

17. The computer-readable storage medium of claim 16, wherein an interpolation filter accurate to the sub-pixel scale is applied to the reference frame at the at least one scaled coordinate before performing motion prediction on the current block by reference to the located predictor block.

* * * * *